(12) United States Patent
Itabashi et al.

(10) Patent No.: US 7,578,242 B2
(45) Date of Patent: Aug. 25, 2009

(54) MAGNETIC LEVITATION TRANSPORTATION SYSTEM GROUND COIL UNIT AND MANUFACTURING METHOD THEREOF

(75) Inventors: Yoshifumi Itabashi, Chiyoda-ku (JP); Yoshihiro Jizo, Chiyoda-ku (JP); Akihiro Fujita, Chiyoda-ku (JP); Hiromori Ishihara, Nagoya (JP); Hiroaki Ota, Nagoya (JP); Toru Iga, Ichihara (JP); Haruo Kobayashi, Ichihara (JP); Yaichi Fuwa, Chiyoda-ku (JP)

(73) Assignees: Mitsubishi Electric Corporation, Chiyoda-Ku, Tokyo (JP); Central Japan Railway Company, Nagoya-Shi, Aichi (JP); Idemitsu Kosan Co., Ltd., Chiyoda-Ku, Tokyo (JP)

( * ) Notice: Subject to any disclaimer, the term of this patent is extended or adjusted under 35 U.S.C. 154(b) by 0 days.

(21) Appl. No.: 12/295,553
(22) PCT Filed: Aug. 17, 2007
(86) PCT No.: PCT/JP2007/066026
§ 371 (c)(1),
(2), (4) Date: Sep. 30, 2008
(87) PCT Pub. No.: WO2008/020626
PCT Pub. Date: Feb. 21, 2008

(65) Prior Publication Data
US 2009/0120322 A1 May 14, 2009

(30) Foreign Application Priority Data
Aug. 17, 2006 (JP) .............................. 2006-222636

(51) Int. Cl.
*H01F 7/20* (2006.01)
*B60L 13/10* (2006.01)
(52) U.S. Cl. ....................................... 104/286; 104/294

(58) Field of Classification Search ......... 104/281–286, 104/290–294
See application file for complete search history.

(56) References Cited

U.S. PATENT DOCUMENTS 5,178,072 A   1/1993  Suzuki

FOREIGN PATENT DOCUMENTS

| JP | 59-050701 A |   | 3/1984 |
| JP | 2-065204 A |   | 3/1990 |
| JP | 04117110 A | * | 4/1992 |
| JP | 4-168704 A |   | 6/1992 |
| JP | 5-161337 A |   | 6/1993 |
| JP | 07029731 A | * | 1/1995 |
| JP | 11-113107 A |   | 4/1999 |
| WO | WO 2006/114984 A1 |   | 11/2006 |

OTHER PUBLICATIONS

Form PCT/ISA/210 (International Search Report) dated Nov. 27, 2007.

* cited by examiner

*Primary Examiner*—Ramon M Barrera
(74) *Attorney, Agent, or Firm*—Buchanan Ingersoll & Rooney PC

(57) ABSTRACT

In a magnetic levitation transportation system ground coil unit in which inside an annular coil conductor that is annularly wound, a mounting bush 3 including such a mounting hole 3a as to be parallel to a central axis of the coil conductor is disposed, and the coil conductor and the bush 3 are integrally molded using a thermoplastic resin to form a casing 4 of the coil conductor, thickness of the thermoplastic resin of a connection part that provides a connection between the bush 3 and the coil conductor is made smaller than thickness of the coil conductor, and a plurality of reinforcing ribs 4b to 4i that are formed using the thermoplastic resin are provided radially from the bush 3 side toward the coil conductor side to be integral with the connection part and the casing 4.

5 Claims, 4 Drawing Sheets

MAGNETIC LEVITATION TRANSPORTATION SYSTEM GROUND COIL UNIT AND MANUFACTURING METHOD THEREOF

TECHNICAL FIELD

The present invention relates to a magnetic levitation transportation system ground coil unit, which is located on the ground in a superconducting magnetic levitation transportation system, and which drives, levitates or guides a vehicle by electromagnetic induction with a superconducting magnet unit that is mounted on the vehicle, and to a manufacturing method thereof.

BACKGROUND ART

Conventionally, in a magnetic levitation transportation system ground coil unit, a mounting bush is disposed so that the central axis of a hole thereof is parallel to the central axis of a coil conductor that is annularly wound, and a reinforcing glass fiber mat is laminated in a center line direction of the hole of the bush. The outermost layer of the reinforcing glass fiber mat is located so as to cover the coil conductor from two sides. Furthermore, a flange portion in which the bush is embedded is formed to be thin (for example, refer to Patent Document 1).

Patent Document 1: the Japanese Patent Publication (unexamined) No. 113107/1999 (Page 4, FIGS. 1 and 2)

DISCLOSURE OF INVENTION

Problem to be Solved by the Invention

In the conventional magnetic levitation transportation system ground coil unit, since the outermost layer of the reinforcing glass fiber mat is located so as to cover the coil conductor from two sides, and the thickness of the reinforcing glass fiber mat that provides a connection between the bush and the coil conductor is larger than the thickness of the coil conductor, a problem exists in larger weight.

The present invention was made to solve the above-described problems, and has an object of providing a magnetic levitation transportation system ground coil unit in which the thickness of a connection part that provides a connection between the bush and the coil conductor is made smaller than the thickness of the coil conductor, thus enabling to achieve weight saving, and providing a manufacturing method thereof.

Means of Solution to the Problem

The present invention provides a magnetic levitation transportation system ground coil unit in which, inside an annular coil conductor that is annularly wound, a mounting bush including such a mounting hole as to be parallel to a central axis of the coil conductor is disposed, and the coil conductor and the bush are integrally molded using a thermoplastic resin to form a casing of the mentioned coil conductor, wherein a thickness of the thermoplastic resin of a connection part that provides a connection between the bush and the coil conductor is made smaller than a thickness of the coil conductor, and a plurality of reinforcing ribs, which are formed using the thermoplastic resin, are provided radially from the bush side toward the coil conductor side to be integral with the connection part and the casing.

EFFECT OF THE INVENTION

In this invention, due to that the thickness of a thermoplastic resin of the connection part providing a connection between the bush and the coil conductor is made smaller than the thickness of the coil conductor, and that a plurality of reinforcing ribs, which are formed using a thermoplastic resin, are provided radially from the bush side to the coil conductor side to be integral with the connection part, the amount of the thermoplastic resin can be reduced to achieve weight saving, and a sufficient strength can be kept between the reinforcing rib and the connection part on which a stress is concentrated.

Figure 1:
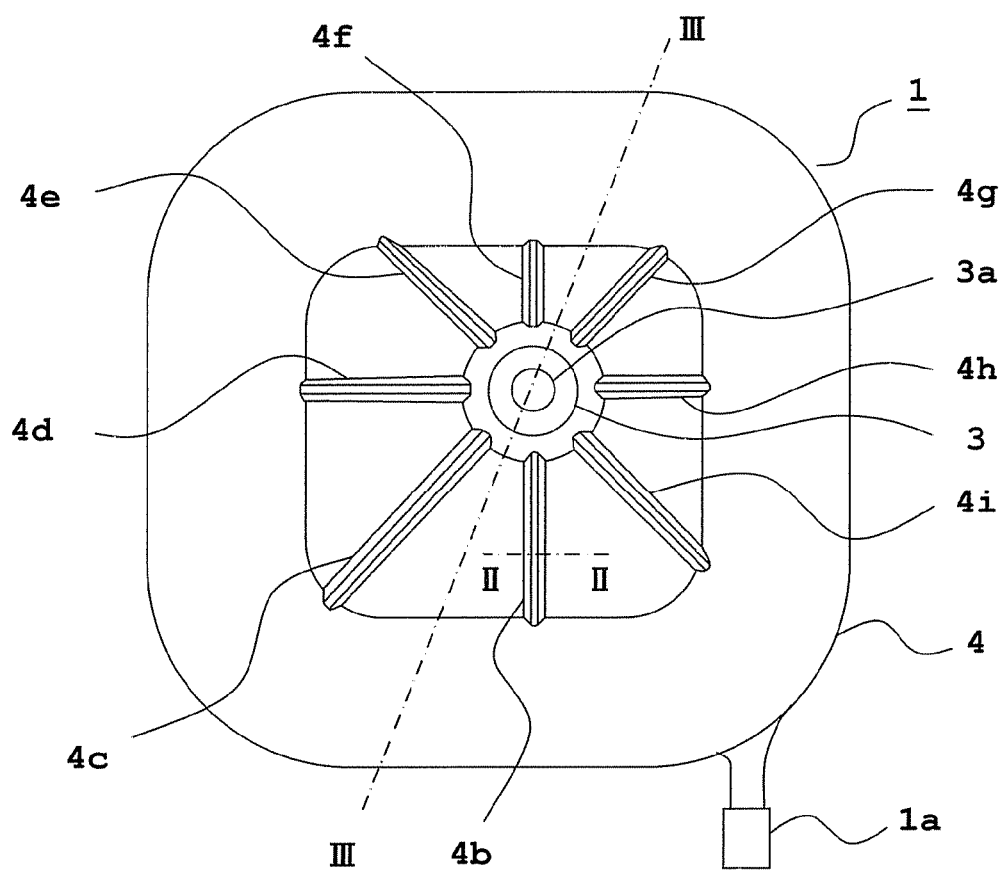
FIG. 1 is a front view of a magnetic levitation transportation system ground coil unit according to a first embodiment for carrying out the present invention.

DESCRIPTION OF REFERENCE NUMERALS 1, 6, 8: ground coil unit, 2: coil conductor, 3: bush, 3a: mounting hole, 4, 7, 9: casing, 4a, 7a, 9a: connection part, 4b-4i, 7b-7i, 9b-9i: reinforcing ribs, 5: mold, 5c: cavity, and 5d: gate

BEST MODE FOR CARRYING OUT THE INVENTION

Embodiment 1

Figure 2:
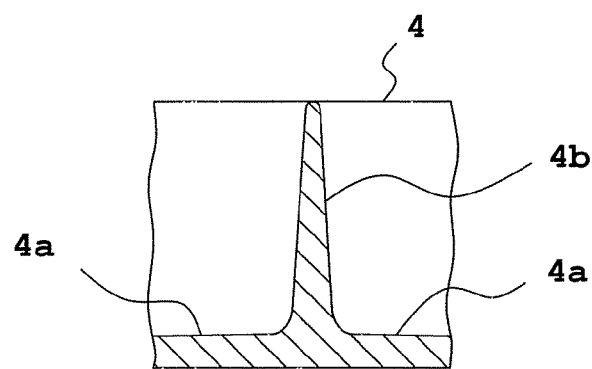
FIG. 2 is a sectional view taken along the line II-II of FIG. 1.
Figure 3:
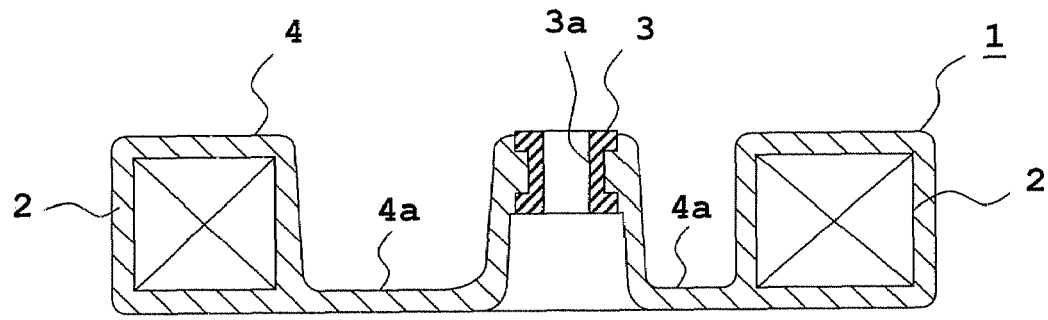
FIG. 3 is a sectional view taken along the line III-III of FIG. 1.
Figure 4:
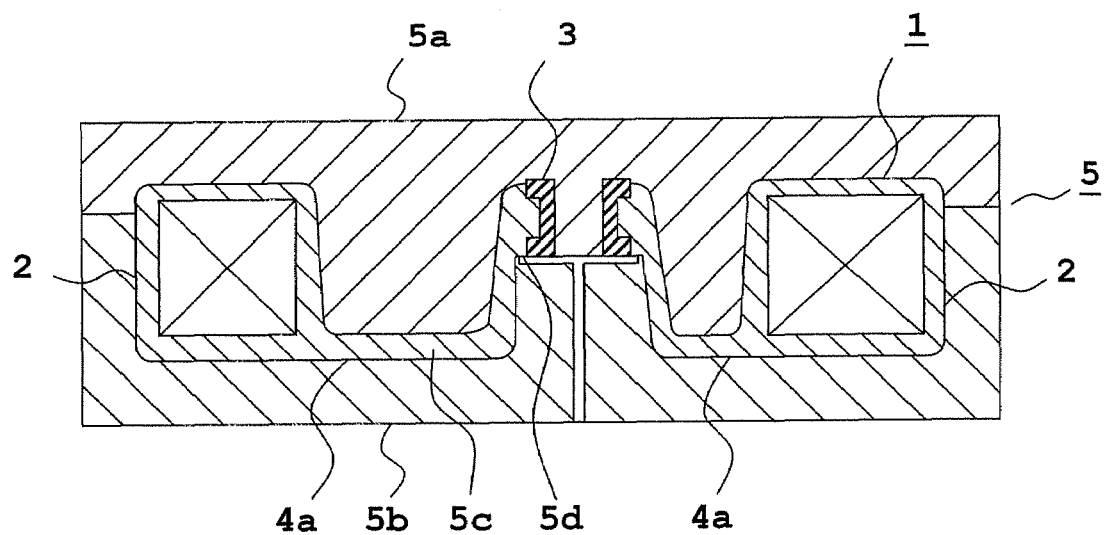
FIG. 4 is a sectional view illustrating the state in a mold of the portion corresponding to the cross section along the line III-III of FIG. 1.

FIG. 1 is a front view of a magnetic levitation transportation system ground coil unit according to a first exemplary embodiment for carrying out the present invention; FIG. 2 is a sectional view taken along the line II-II of FIG. 1; FIG. 3 is a sectional view taken along the line III-III of FIG. 1; and FIG. 4 is a sectional view illustrating the state in a mold of the portion corresponding to the cross section along the line III-III of FIG. 1.

With reference to FIGS. 1 to 4, in a ground coil unit including a terminal 1a, a coil conductor 2 and a bush 3 including a mounting hole 3a are integrally molded using a thermoplastic resin to form a casing 4.

The mounting bush 3 is disposed so that the central axis of the mounting hole 3a is parallel to the central axis of the coil conductor 2.

The bush 3 and the coil conductor 2 are connected together by a connection part 4a of a thermoplastic resin of which thickness is made smaller than that of the coil conductor 2 as illustrated in FIG. 3.

In addition, each reinforcing rib 4b to 4i of a cross section illustrated in FIG. 2 which is formed using a thermoplastic resin is provided radially from the bush 3 side toward the coil conductor 2 side so as to be integral with the connection part 4a and the casing 4.

In the case of manufacturing the ground coil unit 1, first the coil conductor 2 that is annularly wound is put in a cavity 5c of a mold 5 that is composed of separate members 5a and 5b that can be separated.

The coil conductor 2 is secured in the cavity 5c by a pedestal (not illustrated) that is made of a thermoplastic resin.

In the bottom of the separate body 5b of the mold 5, as illustrated in FIG. 4, a gate 5d is formed so that a thermoplastic resin having been injected from the underside in the drawing is abutted against the separate body 5a that closes the bush 3 and the inside of the bush 3 to be injected in the cavity 5c from the outer circumference of the bush 3.

In this state, a thermoplastic resin at a predetermined temperature is injected into the cavity 5c through the gate 5d.

The thermoplastic resin having been injected from the gate 5d flows through the connection part 4a and the reinforcing ribs 4b to 4i, and the cavity 5c is filled up so as to surround the coil conductor 2, thus the casing 4 being formed.

In this manner, the thermoplastic resin having been injected from the gate 5d flows radially from the outer circumference of the bush 3 to the coil conductor 2 side to form the casing 4 of the coil conductor 2, the connection part 4a and each of the reinforcing ribs 4b to 4i.

At this time, for example, the thermoplastic rein having been injected from the adjacent reinforcing ribs 4b and 4c to the portion that will be the casing 4 of the coil conductor 2 is collided at the portion of the casing 4 being substantially midway between the reinforcing ribs 4b and 4c.

That is, a weld, which is produced by the collision of a thermoplastic resin having been injected in the mold 5 (it is a layer of the thermoplastic resin to be likely to crack), can be produced avoiding a connection portion between the reinforcing rib 4b, 4c and the casing 4 where a stress is high.

As described above, due to that the thickness of a thermoplastic resin of the connection part 4a providing a connection between the bush 3 and the coil conductor 2 is made smaller than the thickness of the coil conductor 2, and that a plurality of reinforcing ribs 4b to 4i, which are formed using a thermoplastic resin, are provided radially from the bush 3 side to the coil conductor 2 side to be integral with the connection part 4a and the casing 4, the amount of the thermoplastic resin can be reduced to achieve weight saving, the strength between each of the reinforcing ribs 4b to 4i and the connection part 4a where a stress is concentrated can be improved, as well as the strength of the connection portion between each of the reinforcing ribs 4b to 4i and the casing 4 where a stress is relatively high can be improved.

Embodiment 2

Figure 5:
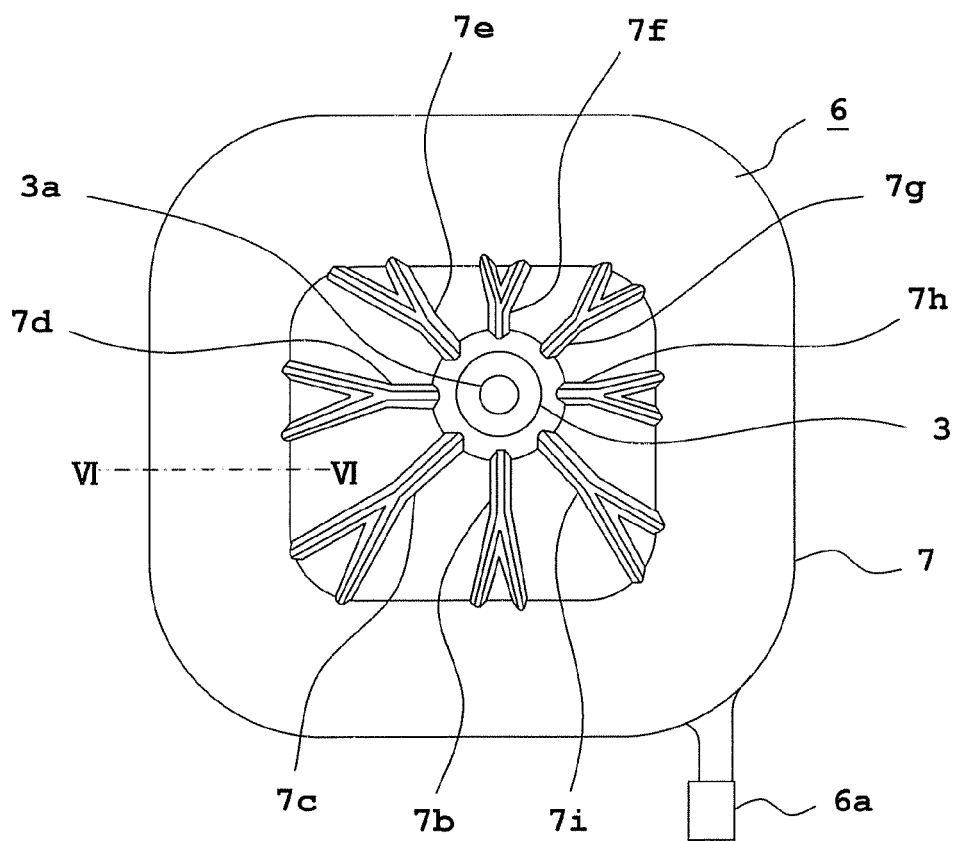
FIG. 5 is a front view of a magnetic levitation transportation system ground coil unit according to a second embodiment for carrying out the invention.
Figure 6:
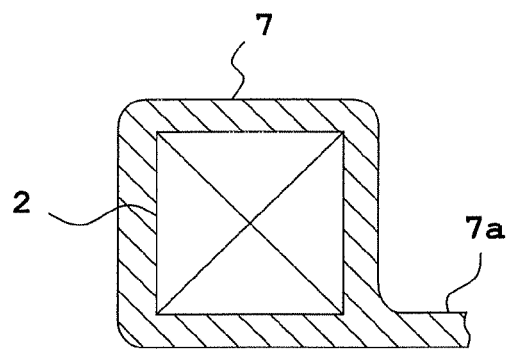
FIG. 6 is a sectional view taken along the line VI-VI of FIG. 5.

FIG. 5 is a front view of a magnetic levitation transportation system ground coil unit according to a second embodiment for carrying out the invention, and FIG. 6 is a sectional view taken along the line VI-VI of FIG. 5.

Referring to FIGS. 5 and 6, a coil conductor 2 and a bush 3 are the same as those in the first embodiment.

In a ground coil unit 6 including a terminal 6a, the coil conductor 2 and the bush 3 are integrally molded using a thermoplastic resin to form a casing 7.

The mounting bush 3 is disposed so that the central axis of a mounting hole 3a is parallel to the central axis of the coil conductor 2.

The bush 3 and the conductor 2 are connected together by a connection part 7a of a thermoplastic resin of which thickness is made smaller than that of the coil conductor 2 as illustrated in FIG. 6.

In addition, a plurality of reinforcing ribs 7b to 7i, which are formed using a thermoplastic resin radially from the bush 3 side to the coil conductor 2 side, are provided so as to be integral with the connection part 7a and the casing 7. Furthermore, each of the reinforcing ribs 7b to 7i are bifurcated on the coil conductor 2 side.

In the case of manufacturing the ground coil unit 6, in the same manner as in the first embodiment, the coil conductor 2 that is annularly wound is put in a cavity of a mold (not illustrated).

The coil conductor 2 is secured in the cavity by a pedestal (not illustrated) that is made of a thermoplastic resin.

Through a gate (not illustrated) that is provided in the mold, the thermoplastic resin is injected into the cavity from the outer circumference of the bush 3.

In this manner, the thermoplastic resin having been injected from the gate flows radially from the outer circumference of the bush 3 to the coil conductor 2 side to form the casing 7 of the coil conductor 2, the connection part 7a and each of the reinforcing ribs 7b to 7i.

As described above, due to that there are provided a plurality of reinforcing ribs 7b to 7i, which are formed using a thermoplastic resin radially from the bush 3 side toward the coil conductor 2 side to be integral with the connection part 7a, and further that each of the reinforcing ribs 7b to 7i is formed so as to be bifurcated on the coil conductor 2 side, the strength between each of the reinforcing ribs 7b to 7i and the connection part 7a where a stress is concentrated can be improved, as well as the stress at the connection portion between each of the reinforcing ribs 7b to 7c and the casing 7 can be distributed, thus enabling to achieve higher strength.

In the second embodiment, although the one in which each of the reinforcing ribs 7b to 7i is bifurcated on the coil conductor 2 side is described, even with the one of the reinforcing rib being branched into not less than three directions, the same effect can be expected.

Embodiment 3

Figure 7:
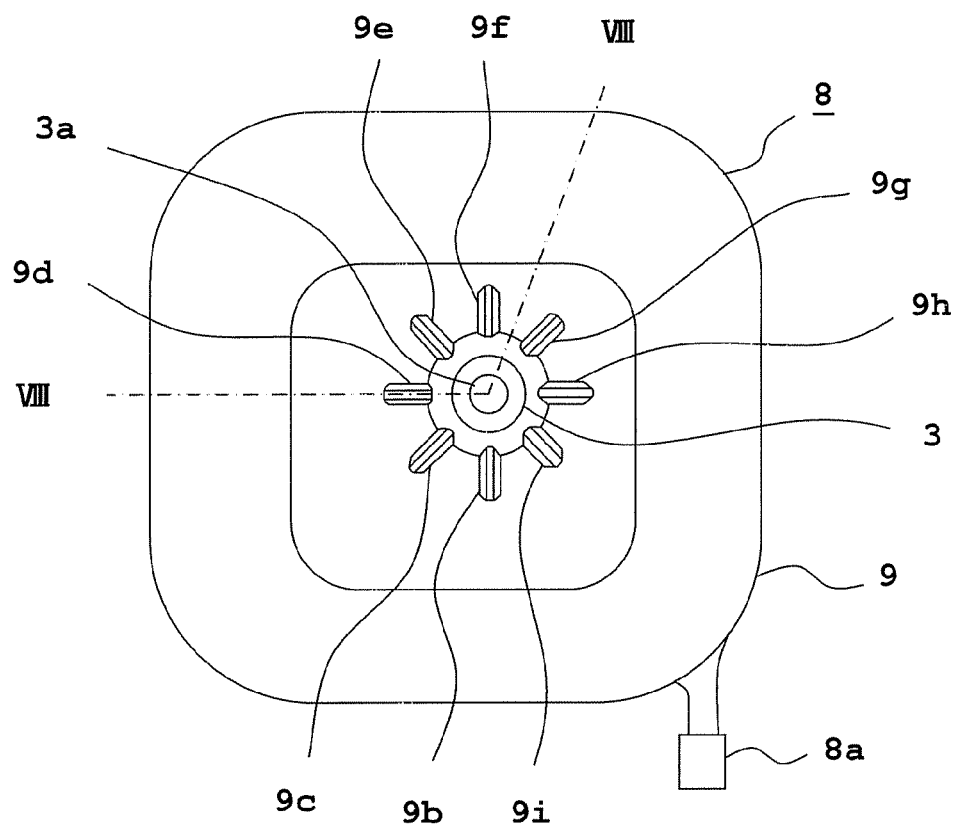
FIG. 7 is a front view of a magnetic levitation transportation system ground coil unit according to a third embodiment for carrying out the invention.
Figure 8:
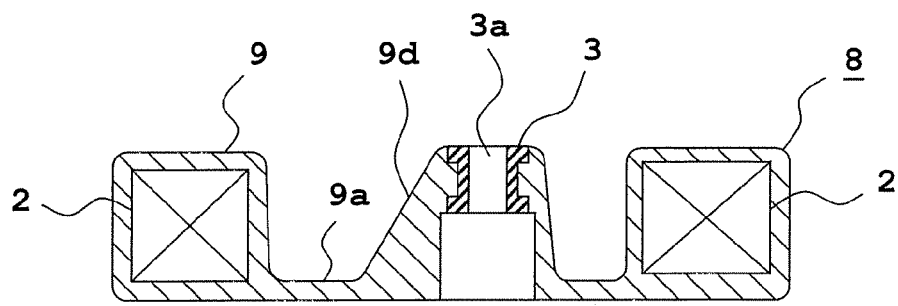
FIG. 8 is a sectional view taken along the line VIII-VIII of FIG. 7.

FIG. 7 is a front view of a magnetic levitation transportation system ground coil unit according to a third embodiment for carrying out the invention, and FIG. 8 is a sectional view taken along the line VIII-VIII of FIG. 7.

Referring to FIGS. 7 and 8, a coil conductor 2 and a bush 3 are the same as those in the first embodiment. In a ground coil unit 8 including a terminal 8a, the coil conductor 2 and the bush 3 are integrally molded using a thermoplastic resin to form a casing 9.

The mounting bush 3 is disposed so that the central axis of a mounting hole 3a is parallel to the central axis of the coil conductor 2.

The bush 3 and the conductor 2 are connected together by a connection part 9a of a thermoplastic resin of which thickness is made smaller than that of the coil conductor 2 as illustrated in FIG. 8.

In addition, a plurality of reinforcing ribs 9b to 9i, which are formed using a thermoplastic resin, are provided radially from the bush 3 side toward the coil conductor 2 side so as to be integral with the connection part 9a.

In the case of manufacturing the ground coil unit 8, in the same manner as in the first embodiment, the thermoplastic resin is injected in the cavity from the outer circumference of the bush 3 through a gate (not illustrated) that is provided in a mold.

As described above, due to that the thickness of a thermoplastic resin of the connection part 9a providing a connection between the bush 3 and the coil conductor 2 is made smaller than the thickness of the coil conductor 2, and that a plurality of reinforcing ribs 9b to 9i, which are formed using the thermoplastic resin, are provided radially from the bush 3 side toward the coil conductor 2 side to be integral with the connection part 9a, the amount of a thermoplastic resin can be reduced to achieve weight saving, and the strength between each of the reinforcing ribs 9b to 9i and the connection part 9a where a stress is concentrated can be improved.

In the third embodiment, by such a construction that each of the reinforcing ribs 9b to 9i is bifurcated on the coil conductor 2 side, the strength between each of the reinforcing ribs 9b to 9i and the connection part 9a can be improved further.

INDUSTRIAL APPLICABILITY

The invention is applicable for weight saving of a magnetic levitation transportation system ground coil unit.

The invention claimed is:

1. A magnetic levitation transportation system ground coil unit in which, inside an annular coil conductor that is annularly wound, a mounting bush including such a mounting hole as to be parallel to a central axis of said coil conductor is disposed, and said coil conductor and said bush are integrally molded using a thermoplastic resin to form a casing of said coil conductor,
    wherein a thickness of said thermoplastic resin of a connection part that provides a connection between said bush and said coil conductor is made smaller than a thickness of said coil conductor, and a plurality of reinforcing ribs, which are formed using said thermoplastic resin, are provided radially from said bush side toward said coil conductor side to be integral with said connection part and said casing.

2. A magnetic levitation transportation system ground coil unit in which, inside an annular coil conductor that is annularly wound, a mounting bush including such a mounting hole as to be parallel to a central axis of said coil conductor is disposed, and said coil conductor and said bush are integrally molded using a thermoplastic resin to form a casing of said coil conductor,
    wherein a thickness of said thermoplastic resin of a connection part that provides a connection between said bush and said coil conductor is made smaller than a thickness of said coil conductor, and a plurality of reinforcing ribs, which are formed using said thermoplastic resin, are provided radially from said bush side toward said coil conductor side to be integral with said connection part.

3. The magnetic levitation transportation system ground coil unit according to claim 1, each of said reinforcing ribs is branched into plural directions on said coil conductor side.

4. A manufacturing method of a magnetic levitation transportation system ground coil unit for manufacturing a ground coil unit in which inside an annular coil conductor that is annularly wound, a mounting bush including such a mounting hole as to be parallel to a central axis of said coil conductor is disposed, said coil conductor and said bush are integrally molded using a thermoplastic resin to form a casing of said coil conductor, a thickness of said thermoplastic resin of a connection part that provides a connection between said bush and said coil conductor is made smaller than a thickness of said coil conductor, and a plurality of reinforcing ribs which are formed using said thermoplastic resin are provided radially from said bush side toward said coil conductor side to be integral with said connection part and said casing,
    wherein said coil conductor and said bush are located in a cavity of a mold, and said thermoplastic resin is injected in the cavity of said mold from a gate that is provided on an outer circumference side of said bush.

5. The magnetic levitation transportation system ground coil unit according to claim 2, each of said reinforcing ribs is branched into plural directions on said coil conductor side.

* * * * *